(12) United States Patent
Fitzgerald et al.

(10) Patent No.: US 9,249,737 B2
(45) Date of Patent: Feb. 2, 2016

(54) METHODS AND APPARATUS FOR RAPID SENSING OF FUEL WOBBE INDEX

(71) Applicant: General Electric Company, Schenectady, NY (US)

(72) Inventors: Russell Paul Fitzgerald, Clifton Park, NY (US); Patrick Edward Pastecki, Pearland, TX (US); Danielle Marie Kalitan, Niskayuna, NY (US); Gary Lee Leonard, Saratoga Springs, NY (US)

(73) Assignee: General Electric Company, Niskayuna, NY (US)

( * ) Notice: Subject to any disclaimer, the term of this patent is extended or adjusted under 35 U.S.C. 154(b) by 432 days.

(21) Appl. No.: 13/777,685

(22) Filed: Feb. 26, 2013

(65) Prior Publication Data

US 2014/0238032 A1   Aug. 28, 2014

(51) Int. Cl.
*F02C 9/00* (2006.01)
*F02C 9/26* (2006.01)

(52) U.S. Cl.
CPC .............. *F02C 9/26* (2013.01); *F05D 2260/80* (2013.01); *F05D 2270/083* (2013.01); *F05D 2270/804* (2013.01); *Y02T 50/677* (2013.01)

(58) Field of Classification Search
CPC ................ F02C 9/32; F02C 9/26; F02C 9/28; F02C 7/22; F23N 2041/20
See application file for complete search history.

(56) References Cited

U.S. PATENT DOCUMENTS

| | | | | |
|---|---|---|---|---|
| 4,380,400 A | * | 4/1983 | Searle | 374/37 |
| 4,382,698 A | * | 5/1983 | Szonntagh | 374/37 |
| 5,572,031 A | * | 11/1996 | Cooper et al. | 250/343 |
| 6,082,092 A | * | 7/2000 | Vandervort | 60/773 |
| 6,490,908 B2 | | 12/2002 | Schley | |
| 6,896,707 B2 | | 5/2005 | O'Rear et al. | |
| 7,151,260 B2 | * | 12/2006 | Markham et al. | 250/339.08 |
| 7,980,082 B2 | | 7/2011 | Ziminsky et al. | |
| 8,042,340 B2 | | 10/2011 | Ma et al. | |
| 8,117,823 B2 | | 2/2012 | Estrada et al. | |
| 2004/0096789 A1 | * | 5/2004 | Vrolijk et al. | 431/12 |
| 2006/0046218 A1 | * | 3/2006 | Joklik et al. | 431/75 |
| 2009/0013759 A1 | | 1/2009 | Knobloch et al. | |
| 2010/0275609 A1 | | 11/2010 | Snider | |
| 2012/0102914 A1 | * | 5/2012 | Kirzhner et al. | 60/39.281 |

* cited by examiner

*Primary Examiner* — Gerald L Sung
(74) *Attorney, Agent, or Firm* — Ann M. Agosti

(57) ABSTRACT

A sensor apparatus and methods for facilitating combustion of a gaseous fuel are provided. The sensor apparatus comprises a combustion apparatus defining a combustion chamber therein. The combustion apparatus is configured to combust a fuel-air mixture within the combustion chamber to produce at least one combustion product. At least one optical diagnostic apparatus is coupled to the combustion apparatus for measuring at least one property of the at least one combustion product within the combustion chamber. A controller is coupled to the at least one optical diagnostic apparatus, and is configured to determine the Wobbe index of the fuel in real-time based on the measured at least one property of the at least one combustion product and pre-determined combustion state data stored within the controller.

16 Claims, 4 Drawing Sheets

METHODS AND APPARATUS FOR RAPID SENSING OF FUEL WOBBE INDEX

BACKGROUND

The field of the disclosure described herein relates generally to monitoring gas turbine engine systems, and more specifically, to methods and systems for measuring fuel Wobbe index.

Industrial turbines are often gas-fired and commonly used to drive electrical generators in power plants. Such gas turbines are designed to burn a specific range of fuels, wherein the rate of fuel consumed may depend on the fuel's chemical composition. Nevertheless, the precise chemical composition of the fuel being burned is not immediately known due to pipeline variability and fuel-gas processing (e.g. regasification of liquid natural gas (LNG). Burning fuel of unknown composition can lead to degraded gas turbine system performance. Many problems associated with burning an unknown fuel can be abated by robust control over the gas turbine if fuel properties are measured prior to combustion, particularly if these properties are varying quickly. In addition to fuel constituent concentrations, fuel heating value and specific gravity are key fuel properties for gas turbine operation. Both are represented by the fuel Wobbe number.

The Wobbe number, or the Wobbe index, is the quotient of the volume-based lower heating value and the square root of the specific gravity of the gas. The Wobbe index is used in industry to control or maintain the amount of energy supplied to fuel gas consumers. Operation of a turbine engine at a Wobbe index outside the design range may result in undesired gas turbine combustor dynamics, such as flame flashback, low equivalence ratio (resulting in flame blowout), and high equivalence ratio or over-firing. These undesired dynamics may result in hardware distress or, possibly, a reduction in component life of the combustion system and/or a potential for power generation outage.

One of the commonly used systems for determining Wobbe index is a gas chromatograph system. The GC system includes a glass capillary system to separate fuel constituents and a thermal conductivity detector or a flame ionization detector (FID) to quantitatively identify the fuel composition. The gas chromatograph system provides measurements that are slow when compared to the time scales associated with fuel variability issues. Further, the system is relatively expensive and difficult to operate. Another commonly used system to determine fuel quality is a calorimeter, wherein the energy of fuel combustion is directly measured. Calorimeters are sensitive to both the fuel composition and the ambient temperature so that large measurement errors are common, especially when ambient temperature varies significantly.

Known methods of measuring fuel Wobbe index are costly, tedious, and slow—i.e. lacking sufficient response time for many industrial applications—particularly when robust control and fuel regulation are required. An improved system is needed for determining the fuel Wobbe index in real-time that may address one or more problems set forth above.

BRIEF DESCRIPTION

In one aspect, a method of facilitating combustion of a gaseous fuel is provided. The method comprises combusting a fuel-air mixture in a combustion apparatus that defines a combustion chamber to yield at least one combustion product. At least one property of the at least one combustion product is then measured using at least one optical diagnostic apparatus. The method further comprises determining the Wobbe index of the fuel in real-time based on the measured at least one property of the at least one combustion product.

In another aspect, a sensor apparatus for facilitating combustion of a gaseous fuel is provided. The sensor apparatus comprises a combustion apparatus that defines a combustion chamber therein. The combustion apparatus is configured to combust a fuel-air mixture within the combustion chamber to produce at least one combustion product. At least one optical diagnostic apparatus coupled to the combustion apparatus is configured to measure at least one property of the at least one combustion product within the combustion chamber. A controller coupled to the at least one optical diagnostic apparatus is configured to determine the Wobbe index of the fuel in real-time based on the measured at least one property of the at least one combustion product and pre-determined combustion state data stored within the controller.

In yet another aspect, a gas turbine engine system is provided. The gas turbine engine system comprises a fuel source configured to supply the gas turbine engine system with a fuel through a primary fuel supply line. A sensor apparatus is coupled in fluid communication with the fuel source. The sensor apparatus comprises a combustion apparatus that defines a combustion chamber therein. The combustion apparatus is configured to combust a fuel-air mixture within the combustion chamber to produce at least one combustion product. At least one optical diagnostic apparatus coupled to the combustion apparatus is configured to measure at least one property of the at least one combustion product within the combustion chamber. The gas turbine engine system further comprises a controller coupled to the sensor apparatus and configured to determine the Wobbe index of the fuel in real-time based on the measured at least one property of the at least one combustion product and pre-determined combustion state data stored within the controller.

DRAWINGS

These and other features, aspects, and advantages of the present invention will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

Embodiments of the present methods and apparatuses rapidly determine the Wobbe Index of a gaseous fuel in real-time having an unknown composition by measuring at least one property of at least one combustion product and/or intermediate generated in a reference combustion apparatus. As used herein, the term "combustion product" is not limited to only products present after combustion is complete, as a result of the fuel being burned, but also includes intermediates that are present during the combustion process, but are fully consumed during combustion such that they are absent when combustion is complete. By measuring at least one property of at least one combustion product, such as the temperature of a reference flame, the temperature of exhaust gases, or other combustion parameters, and at least one associated reactant flow property such as flow restriction pressure drop or mass flow rate of the fuel, the Wobbe Index of the fuel may be determined.

Figure 1:
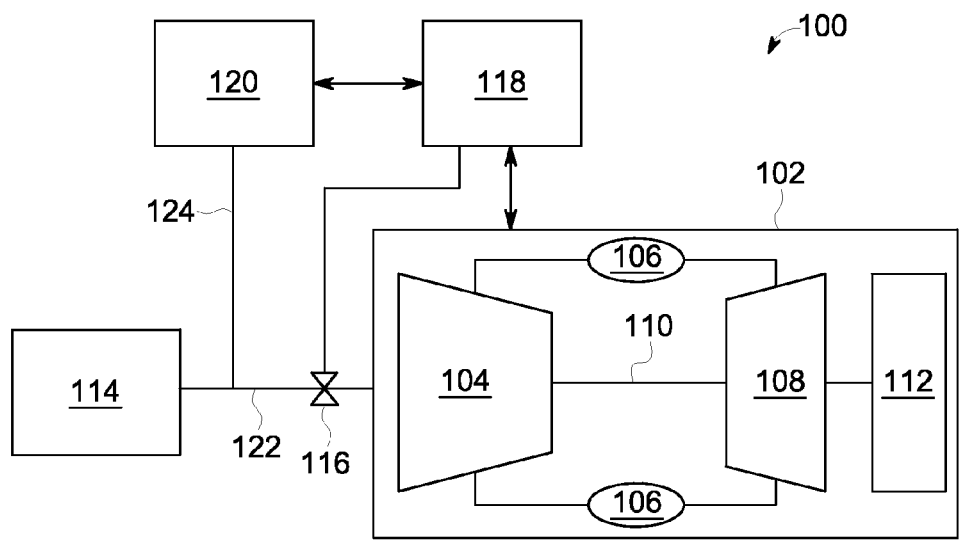
FIG. 1 is schematic diagram of an exemplary gas turbine engine system.

FIG. 1 is a schematic diagram of an exemplary gas turbine engine system 100. In the exemplary embodiment, gas turbine engine system 100 includes a gas turbine engine 102, a fuel source 114, a sensor apparatus 120, and a controller 118. Fuel source 114 and gas turbine engine 102 are coupled in flow communication via a primary fuel line 122 that includes a fuel metering valve 116. A secondary fuel supply line 124 of sensor apparatus 120 is coupled to primary fuel line 122 upstream of fuel metering valve 116 and gas turbine engine 102, such that sensor apparatus 120 is controlled independently of gas turbine engine 102 and configured to measure a property of a combustion product produced within sensor apparatus 120. Controller 118 is coupled to sensor apparatus 120, fuel metering valve 116, and to gas turbine engine 102. Gas turbine engine includes, coupled in serial flow arrangement, a compressor 104, at least one primary combustion section 106, and a turbine 108 that is rotatably coupled to compressor 104 via a shaft 110.

During operation, sensor apparatus 120 extracts a relatively small amount of fuel from primary fuel line 122 and channels the fuel into sensor apparatus 120 through secondary fuel supply line 124. Sensor apparatus 120 includes at least one optical diagnostic apparatus (not shown in FIG. 1) coupled to controller 118 for measuring at least one property of at least one combustion product generated within sensor apparatus 120 as described below. Controller 118 is configured to control fuel metering valve 116 to control the flow of fuel through primary fuel line 122 to gas turbine engine 102 based on the measured combustion product property.

In the exemplary embodiment, ambient air is channeled into gas turbine engine 102 towards compressor 104, and fuel from fuel source 114 is channeled into gas turbine engine 102 toward primary combustion section 106. The ambient air is compressed by compressor 104 prior to being directed towards primary combustion section 106. In the exemplary embodiment, compressed air is mixed with the fuel, and the resulting fuel-air mixture is ignited within primary combustion section 106 to generate combustion gases that are directed towards turbine 108. Moreover, in the exemplary embodiment, turbine 108 extracts rotational energy from the combustion gases and rotates shaft 110 to drive compressor 104. Furthermore, in the exemplary embodiment, turbine assembly 100 drives a load 112, such as a generator, coupled to shaft 110. In the exemplary embodiment, load 112 is downstream of turbine assembly 100. Alternatively, load 112 may be upstream from turbine assembly 100.

Figure 2:
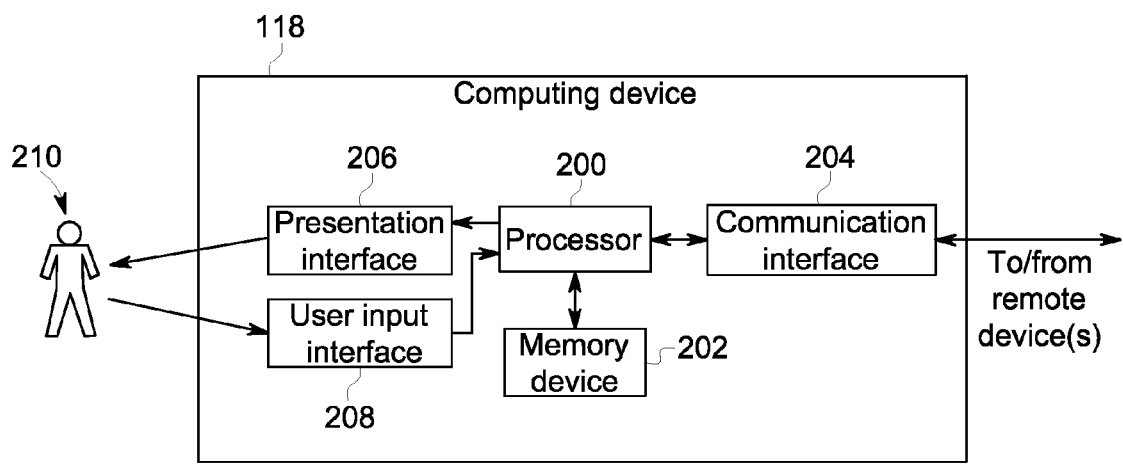
FIG. 2 is a block diagram of an exemplary computing device.

FIG. 2 is a block diagram of an exemplary computing device, or controller, 118 that may be used to analyze measurements received from sensor apparatus 120 and control the fuel supply to gas turbine engine 102. Controller 118 includes a memory device 202 and a processor 200 operatively coupled to memory device 202 for executing instructions. Processor 200 may include one or more processing units, e.g., without limitation, in a multi-core configuration. In some embodiments, executable instructions are stored in memory device 202. Controller 118 is configurable to perform one or more operations described herein by programming processor 200. For example, processor 200 may be programmed by encoding an operation as one or more executable instructions and providing the executable instructions in memory device 202.

In the exemplary embodiment, memory device 202 is one or more devices that enable storage and retrieval of information such as executable instructions and/or other data. Memory device 202 may include one or more computer readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are exemplary only, and are thus not limiting as to the types of memory usable for storage of a computer program. Memory device 202 may be configured to store, without limitation, application source code, application object code, source code portions of interest, object code portions of interest, configuration data, execution events and/or any other type of data.

Memory device 202 may be configured to store operational measurements including, without limitation, real-time and historical reference flame temperatures, differential pressure measurements, oxygen concentration in a gas mixture, and/or any other type data. In some embodiments, processor 200 removes or "purges" data from memory device 202 based on the age of the data. For example, processor 200 may overwrite previously recorded and stored data associated with a subsequent time and/or event. In addition, or alternatively, processor 200 may remove data that exceeds a predetermined time interval. Also, memory device 202 includes, without limitation, sufficient data, algorithms, and commands to facilitate determination of various fuel properties and control of a fuel supply to gas turbine engine 102 as discussed further below.

As used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously, such that the Wobbe index of the gaseous fuel is determined within a one second response time.

In some embodiments, controller 118 includes a presentation interface 206 coupled to processor 200. Presentation interface 206 presents information, such as a user interface and/or an alarm, to a user 210. In one embodiment, presentation interface 206 includes a display adapter (not shown) that is coupled to a display device (not shown), such as a cathode ray tube (CRT), a liquid crystal display (LCD), an organic LED (OLED) display, and/or an "electronic ink" display. In some embodiments, presentation interface 206 includes one or more display devices.

In some embodiments, controller 118 includes a user input interface 208. In the exemplary embodiment, user input interface 208 is coupled to processor 200 and receives input from user 210. User input interface 208 may include, for example, a keyboard, a pointing device, a mouse, a stylus, a touch sensitive panel, e.g., without limitation, a touch pad or a touch screen, and/or an audio input interface, e.g., without limitation, a microphone. A single component, such as a touch screen, may function as both a display device of presentation interface 206 and user input interface 208.

A communication interface 204 is coupled to processor 200 and is configured to be coupled in communication with one or more other devices, such as a sensor or another controller 118, and to perform input and output operations with respect to such devices. For example, communication interface 204 may include, without limitation, a wired network adapter, a wireless network adapter, a mobile telecommunications adapter, a serial communication adapter, and/or a parallel communication adapter. Communication interface 204 may receive data from and/or transmit data to one or more remote devices. For example, a communication interface 204 of one controller 118 may transmit an alarm to the communication interface 204 of another controller 118.

Presentation interface 206 and/or communication interface 204 are both capable of providing information suitable for use with the methods described herein, e.g., to user 210 or another device. Accordingly, presentation interface 206 and communication interface 204 may be referred to as output devices. Similarly, user input interface 208 and communication interface 204 are capable of receiving information suitable for use with the methods described herein and may be referred to as input devices.

Figure 3:
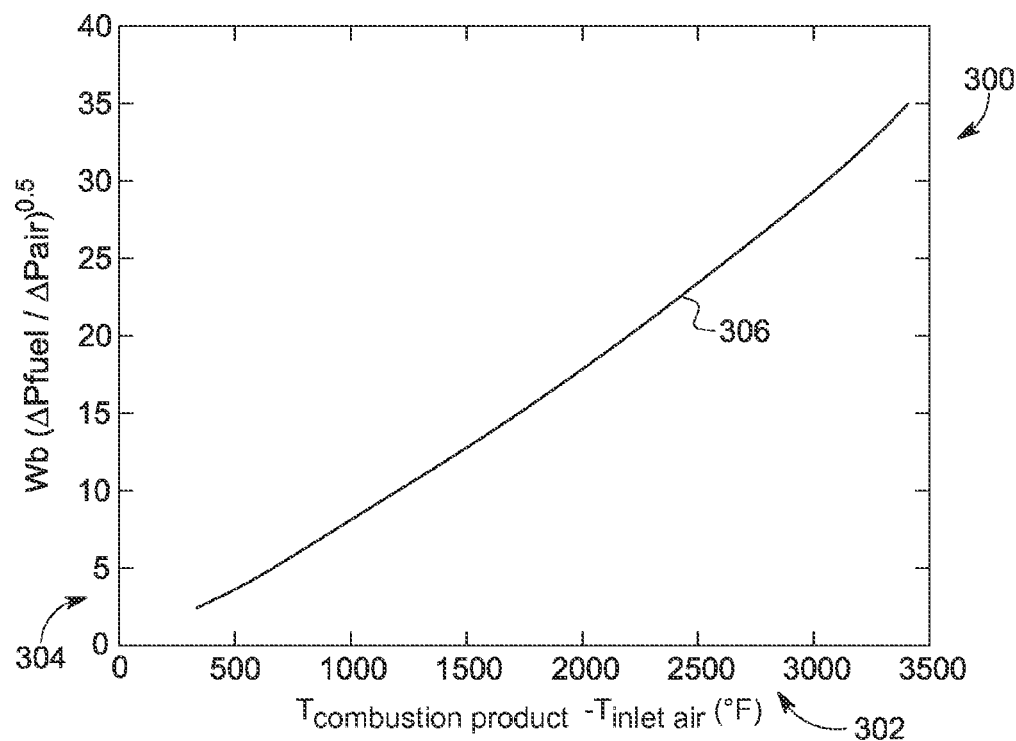
FIG. 3 is a graph illustrating the relationship between the temperature of a reference flame and the Wobbe index of the fuel being burned.

FIG. 3 is a graphical illustration 300 of a Wobbe index parameter versus a measured combustion product temperature difference. The X-axis 302 represents the differential temperature between the combustion products and the inlet air measured in degrees Fahrenheit and the Y-axis 304 represents the Wobbe index parameter defined as the product of the Wobbe index and square root of the ratio of differential fuel pressure to differential air pressure being channeled through sensor apparatus 120 (shown in FIG. 1). The combustion product temperature is determined by at least one optical diagnostic apparatus (not shown in FIG. 3) and the differential pressures of the air and fuel are determined by controller 118 (shown in FIG. 1), where $\Delta P_{fuel}$ and $\Delta P_{air}$ are the measured differential fuel and air pressures across a flow restriction device, such as a venturi section or a coriolis flow meter (not shown in FIG. 3). Use of coriolis flow meters in series with (air and fuel) flow restrictions provide a redundant indication of the relative fuel and air flow rates for more direct computation of the Wobbe index as well as information about relative flow densities that may subsequently be used for direct computation of fuel heating value.

The Wobbe Index is a value that facilitates a comparison of the volumetric energy content of different fuel gases at different temperatures. Fuels having a similar Wobbe Index can be expected to perform similarly when combusted by a gas turbine. The Modified Wobbe Index is generally defined as the lower fuel heating value divided by the relative density. Deviations of ±1-3% from the defined value for each fuel are typically acceptable without noticeable degradation in the gas turbine's operation. However, a deviation of ±20% of the defined Wobbe Index is acceptable based on the methods and apparatus described herein. It is to be appreciated that other criteria could be utilized to determine an associated Wobbe Index The Modified Wobbe Index is defined as:

$$\text{Modified Wobbe index} = LHV_{fuel}/(SG_{fuel}T_{fuel})^{0.5}, \qquad \text{Eq. (1)}$$

where $LHV_{fuel}$ represents the lower heating value of the gaseous fuel being burned, $SG_{fuel}$ represents the specific gravity of the gaseous fuel relative to the air, and $T_{fuel}$ represents the temperature of the gaseous fuel. With determined values for $LHV_{fuel}$, $SG_{fuel}$, and $T_{fuel}$, the Modified Wobbe index of the gaseous fuel may be determined.

Variations in Wobbe Index from the specified value can lead to unacceptable levels of combustion dynamics, higher than expected levels of pollutant emissions, overfiring, flame instability, and many other problems. Consequently, operation with large variations in the Wobbe Index from a specified value may result in hardware distress or, possibly, a reduction in component life of the combustion system and/or a potential for power generation outage.

As defined above, Wobbe Index is a measure of the amount of energy per volume flow injected in a gas turbine combustor and, thus, may be a measure of the interchangeability of gas fuel in a given system design. Fuels from different sources or fuels composed of different constituent gases may have variable energy content. Operation of gas turbine engine 102 at an off-design Wobbe Index may cause undesired combustion characteristics such as flame flash back or a low equivalence ratio. The equivalence ratio is the ratio of air to fuel of the air-fuel mixture. Thus, for gas turbine engine 102 to be able to switch or continuously vary from a first gaseous fuel to a second gaseous fuel, for which the specific composition of the second gaseous fuel is unknown, a method of determining the Wobbe Index is desirable to maintain system performance.

Referring again to FIG. 3, the Wobbe index parameter increases with temperature as illustrated by curve 306. Curve 306 represents a key calibrated correlation between the product of the Wobbe index and the square root ratio of fuel-to-air flow with the measured reference flame temperatures. As will be seen by one of ordinary skill in the art, when the combustion product temperature, flow restriction pressure drops, $\Delta P_{fuel}$ and $\Delta P_{air}$, and/or the mass flow of the fuel are measured by optical sensor apparatus 120 (shown in FIG. 1), the Wobbe index of the fuel being combusted is determined by curve 306. Analytical and empirical studies show that the Wobbe index parameter on y-axis 304 is directly correlated with reference flame temperature of a combustion system for all fuel mixtures and constituents independent of equivalence ratios and flow rates. This Wobbe index correlation is represented by:

$$(T_f - T_i) \approx \frac{A_{r,fuel}}{A_{r,air}} \frac{\sqrt{SG_{air}}}{\rho_{air} c_{p,mix}} MWI \sqrt{\frac{\Delta P_{fuel}}{\Delta P_{air}}}, \quad \text{Eq. (2)}$$

where $T_f$ represents the temperature of the reference flame or the exhaust gases; $T_i$ represents the temperature of the air at an air inlet; $A_{r,fuel}$ represents the area of the conduit flow restriction supplying the fuel to the system; whereas $A_{r,air}$ represents the area of conduit flow restriction supplying the air to the system; $SG_{air}$ represents the specific gravity of the air; $\rho_{air}$ represents the density of air; $c_{p,mix}$ represents the specific heat of the fuel-air; $W_{index}$ represents the Wobbe index of the gaseous fuel being combusted; $\Delta P_{fuel}$ represents the measured differential pressure of fuel across a first flow restriction device (not shown in FIG. 3); and $\Delta P_{air}$ represents the measured differential pressure of air across a second flow restriction device (not shown in FIG. 3).

Each of the above variables and parameters are constant or may be measured such that the Wobbe index may be calculated. The constant values associated with the combustion of the gaseous fuel: $c_{p,mix}$, $\rho_{air}$, $A_{r,fuel}$ and $SG_{air}$ are pre-determined combustion state data, and are stored on memory device 202 (shown in FIG. 2). The remaining parameter values, with the exception of the Wobbe index, are measured by various sensors within gas turbine engine system 100 (shown in FIG. 1). The Wobbe index equation (Eq. 1) and the Wobbe index correlation equation (Eq. 2) are stored as pre-determined combustion data algorithms on memory device 202 (shown in FIG. 2) such that controller processor 200 (shown in FIG. 2) may calculate the Wobbe index in real-time upon receipt of measurements from sensor apparatus 120 (shown in FIG. 1) as described below.

In the exemplary embodiment, the first and second flow restriction devices are at least one of a venturi section or a Coriolis flow meter. A venturi section is a narrow cross section in a fluid conduit designed to increase the speed of fluid flowing through the conduit. When a fluid is forced through the venturi, its velocity increases relative to that in a larger cross sectioned area of the fluid conduit, and therefore, the pressure of the fluid decreases. The pressure difference is measured between the wide and narrow parts of the fluid conduit and that pressure difference is proportional to the volumetric flow rate of the fluid. The first venturi section may be used to measure the pressure differential of the fuel, and the second venturi section may be used to measure the pressure differential pressure of the air. These measurements may then be transmitted to controller 118 for calculating the Wobbe index of the fuel using the Wobbe index correlation equation (Eq. 2). Alternatively, first and second flow restriction devices may be a coriolis flow meter used to measure the mass flow and specific gravity of the fuel and/or air. These measurements may then be transmitted to controller 118 for calculating the Wobbe index of the fuel using the Wobbe index equation (Eq. 1). First and second flow restriction devices may be any combination of venturi sections and/or Coriolis flow meters that enable sensor apparatus 120 to function as described herein.

Figure 4:
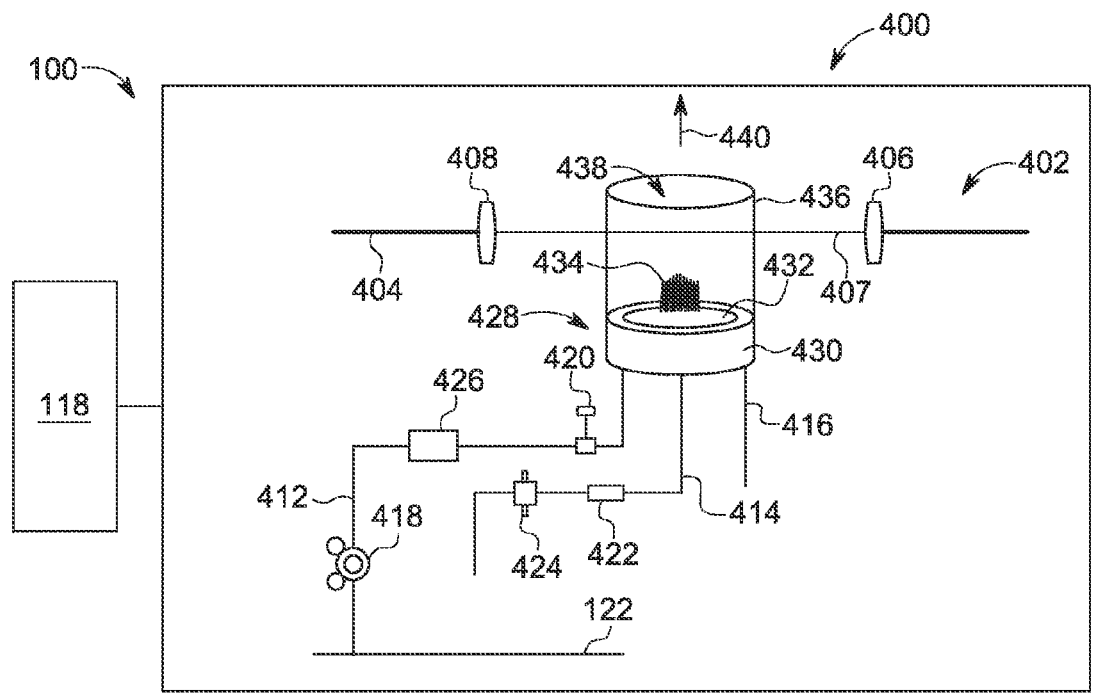
FIG. 4 is an embodiment of an exemplary sensor apparatus for use in a gas turbine engine system.

FIG. 4 is an exemplary embodiment of an optical sensor apparatus 400 for use in gas turbine engine system 100. Sensor apparatus 400 is coupled to controller 118 and provides a controlled combustion environment operating independently of gas turbine engine 102 (shown in FIG. 1). Processor 200 (shown in FIG. 2) interfaced with controller 118 is configured to monitor and record measurements taken within sensor apparatus 400. In the exemplary embodiment, sensor apparatus 400 includes a fuel supply line 412, an air supply line 414, and a purge line 416. Fuel supply line 412 includes a fuel pressure regulator 418 for controlling the pressure of the fuel being channeled through line 412, a first flow restriction device 426 configured to facilitate a fuel pressure differential, mass flow, or specific gravity measurement in fuel supply line 412, and a fuel metering valve or mass flow controller 422 for controlling the amount of fuel channeled to sensor apparatus 400. Fuel supply line 412 is coupled in flow communication with primary fuel line 122. Air supply line 414 includes a second flow restriction device 424 configured to facilitate an air pressure differential or mass flow measurement in air supply line 414 and an air mass flow controller 422 for controlling the amount air channeled to sensor apparatus 400.

In the exemplary embodiment, first and second flow restriction devices 426 and 424 may be venturi sections configured to measure the differential pressure of the fuel flowing through fuel supply line 412. Alternatively, first and second flow restriction devices 426 and 424 may be Coriolis flow meters configured to measure at least one of the specific gravity and the mass flow of fuel and air flowing through supply lines 412 and 414. These measurements may then be transmitted to controller 118 for calculating the Wobbe index of the fuel using at least one of the Wobbe index equation (Eq. 1) and the Wobbe index correlation equation (Eq. 2). Lines 412, 414, and 416 are coupled in flow communication with a reference combustion apparatus 428.

Reference combustion apparatus 428 includes a mixer portion 430, a reference burner 432, and a flame containment vessel 436. Mixer portion 430 is configured to blend the fuel from line 412 and air 414 into a fully premixed combustible fuel-air mixture. Reference burner 432 is positioned upstream in parallel with combustion section 106 and is configured to burn the fuel-air mixture to produce at least one combustion product such as a reference flame 434 and/or exhaust gases 440. In the exemplary embodiment, reference burner 432 is a premixed McKenna reference burner that provides a well-defined, controlled flame within containment vessel 436. Each of the combustion products includes at least one property, such as a temperature of reference flame 434, a temperature of exhaust gases 440, and an oxygen concentration of exhaust gases 440. Containment vessel 436 defines a reference combustion chamber 438 such that reference flame 434 is housed therein. Exhaust gases 440 produced by reference flame 434 within reference combustion chamber 438 are channeled from reference combustion chamber 438 through containment vessel 436 and into the atmosphere or a suitable exhaust (not shown). In the exemplary embodiment, containment vessel 436 is a transparent vessel, such as a quartz flame tube, designed to have optical access to enable sensor apparatus 400 to function as described herein. Alternatively, containment vessel 436 may be any transparent vessel than enables sensor apparatus 400 to function as described herein.

In the exemplary embodiment, sensor apparatus 400 includes a tunable diode laser absorption (TDL) apparatus 402 coupled to controller 118. TDL apparatus 402 includes an optical fiber 404 coupled to a laser transmitter 408 configured to transmit a laser beam 407 across reference combustion chamber 438, and more specifically, through at least one combustion product. TDL apparatus 402 further includes a laser receiver 406 coupled to optical fiber 404 and positioned opposite containment vessel 436 from laser transmitter 408 such that laser receiver 406 is configured to receive laser beam 407 from transmitter 408. TDL apparatus 402 is an optical diagnostic apparatus configured to measure at least one property of at least one combustion product, such as the temperature of reference flame 434 and/or the temperature of exhaust gases 440, produced in reference combustion chamber 438.

In operation, an amount of fuel is extracted from primary fuel line 122 and channeled through sensor apparatus fuel supply line 412. Pressure regulator 418 regulates the fuel pressure in line 412 such that the pressure of the fuel flowing through line 412 is known as the fuel enters first flow restriction device 426. First flow restriction device 426 causes a fuel pressure differential that is measured by controller 118 and stored within memory device 202 (shown in FIG. 2). Alternatively, first flow restriction device 426 measures at least one of the mass flow and the specific gravity of the fuel and transmits such measurement to controller 118 for storage within memory device 202. Fuel then flows through fuel metering valve 420 and into mixer portion 430 of reference combustion apparatus 428. Similarly, air is channeled into air supply line 414 from an air supply source (not shown) and through second flow restriction device 424. Second flow restriction device 424 causes an air pressure differential that is also measured by controller 118 and stored within memory device 202. Air then flows through air mass flow controller 422 and into mixer portion 430 of reference combustion apparatus 428. In the exemplary embodiment, mixer portion 430 blends the fuel and air to produce a pre-mixed combustible fuel-air mixture that is ignited by reference burner 432. In one embodiment, proportions of fuel and air are fixed such that the equivalence ratio is less than unity—i.e. a lean flow mixture.

Reference burner 432 ignites the fuel-air mixture to produce a reference flame 434 that generates exhaust gases 440 within reference combustion chamber 438. Transmitter 408 of TDL apparatus 402 then transmits laser beam 407 across reference combustion chamber 438 such that laser beam 407 is received by receiver 406. Laser beam 407 is altered by the combustion products within reference combustion chamber 438 to generate data related to the temperature of at least one of the combustion products. The data is then communicated to controller 118, which contains logic required to analyze the measured data to determine the temperature of at least one of the combustion products, that is, reference flame 434 and/or exhaust gases 440, such that processor 200 (shown in FIG. 2) determines the Wobbe index in real-time using at least one of the Wobbe index equation (Eq. 1) and the Wobbe index correlation equation (Eq. 2). Specifically, in the exemplary embodiment, controller 118 receives the measured data from TDL apparatus 402 and determines the temperature of at least one combustion product.

Controller 118 further measures the differential fuel and air pressures across first and second flow restriction devices 426 and 424. Alternatively, controller 118 receives a signal from first flow restriction device 426 indicative the mass flow and/or the specific gravity of the fuel within fuel supply line 412. Processor 200 (shown in FIG. 2) then accesses pre-determined combustion state data stored in memory device (shown in FIG. 2) and calculates the Wobbe index of the fuel using at least one of the Wobbe index equation (Eq. 1) and the Wobbe index correlation equation (Eq. 2) based on the measured combustion property and at least one of the measured differential fuel and air pressures, the mass flow of the fuel, and the specific gravity of the fuel. Once the Wobbe index of the fuel is calculated, controller 118 may then control the amount of fuel channeled to gas turbine engine 102 through primary fuel line 122 by operating fuel metering valve 116 (all shown in FIG. 1) based on the determined Wobbe index. Sensor apparatus 400 measures the Wobbe index in real-time, subsequently allowing instantaneous control of burner duty and firing temperatures of gas turbine engine 102. Use of combustion product temperatures as a metric facilitates the Wobbe index to be determined for a nearly limitless range of fuel constituents.

Figure 5:
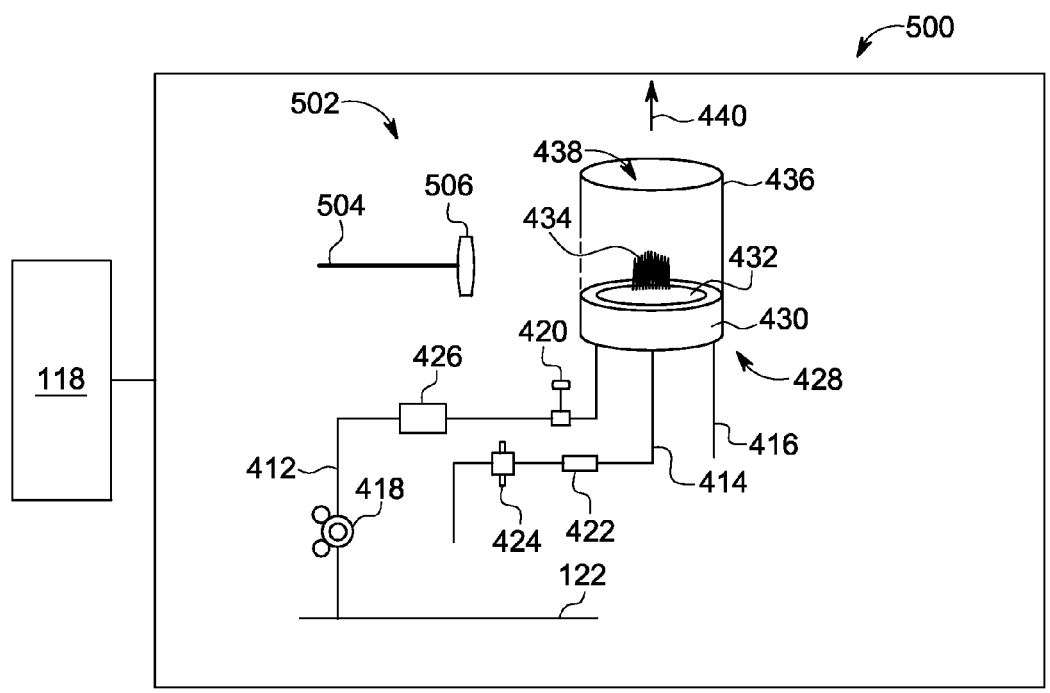
FIG. 5 is an alternative embodiment of an exemplary sensor apparatus for use in a gas turbine engine system.

FIG. 5 illustrates an alternative embodiment of an optical sensor apparatus 500 for use in gas turbine engine system 100 (shown in FIG. 1). Sensor apparatus 500 is substantially similar to sensor apparatus 400 (shown in FIG. 4) in operation and composition, with the exception that sensor apparatus 500 includes an emission spectroscopy apparatus 502, rather than TDL apparatus 402 (shown in FIG. 4). As such, components shown in FIG. 5 are labeled with the same reference numbers used in FIG. 4. Emission spectroscopy apparatus 502 may be substituted for TDL apparatus 402 within sensor apparatus 400, or may be used in combination with TDL apparatus 402.

In the exemplary embodiment, emission spectroscopy apparatus 502 is an optical diagnostic apparatus that is coupled to controller 118 includes an optical fiber 504 and a collection lens 506 configured to gather ultraviolet light emitted from reference flame 434. In operation, emission spectroscopy apparatus 502 is positioned adjacent to containment vessel 436 such that collection lens 506 is directed towards reference flame 434 within reference combustion chamber 438. Collection lens 506 gathers the ultraviolet light emitted by reference flame 434 into optical fiber 504, which then communicates the emitted ultraviolet light to a spectrometer (not shown) coupled to controller 118 for further analysis. Integrating portions of the resulting intensity spectrum enables controller 118 to generate a spectrum band ratio that is used to determine the temperature of reference flame 434. Controller 118 receives this measured data from emission spectroscopy apparatus 502 and determines the temperature of at least one combustion product, reference flame 434 and/or exhaust gases 440. Controller 118 further measures the differential fuel and air pressures across first and second flow restriction devices 426 and 424. Alternatively, controller 118 receives a signal from first flow restriction device 426 indicative the mass flow and/or the specific gravity of the fuel within fuel supply line 412.

Processor 200 (shown in FIG. 2) then accesses pre-determined combustion state data stored in memory device (shown in FIG. 2) and calculates the Wobbe index of the fuel using at least one of the Wobbe index equation (Eq. 1) and the Wobbe index correlation equation (Eq. 2) based on the measured combustion property and at least one of the measured differential fuel and air pressures, the mass flow of the fuel, and the specific gravity of the fuel. Once the Wobbe index of the fuel is calculated, controller 118 may then control the amount of fuel channeled to gas turbine engine 102 through primary fuel line 122 by operating fuel metering valve 116 (all shown in FIG. 1) based on the determined Wobbe index. Sensor apparatus 500 measures the Wobbe index in real-time, subsequently allowing instantaneous control of burner duty and firing temperatures of gas turbine engine 102. Use of combustion product temperatures as a metric facilitates the Wobbe index to be determined for a nearly limitless range of fuel constituents.

Figure 6:
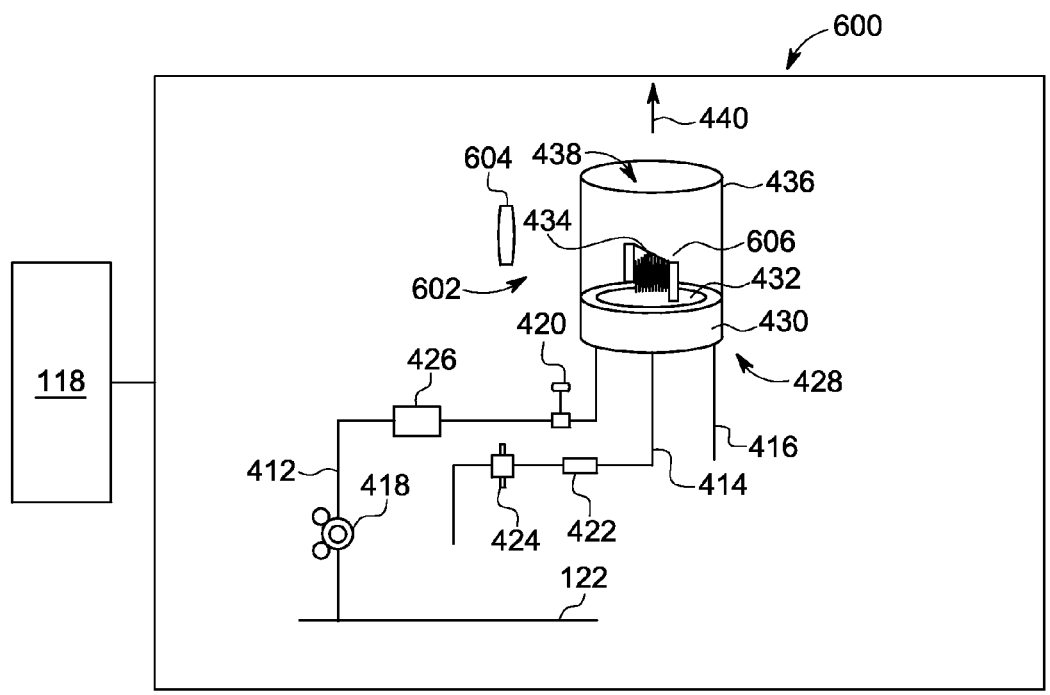
FIG. 6 is another alternative embodiment of an exemplary sensor apparatus for use in a gas turbine engine system.

FIG. 6 illustrates an alternative embodiment of an optical sensor apparatus 600 for use in gas turbine engine system 100 (shown in FIG. 1). Sensor apparatus 600 is substantially similar to sensor apparatus 400 and 500 (shown in FIGS. 4 and 5), with the exception that sensor apparatus 600 includes a fiber pyrometry apparatus 602, rather than TDL apparatus 402 or emission spectroscopy apparatus 502 (shown in FIGS. 4 and 5). As such, components shown in FIG. 6 are labeled with the same reference numbers used in FIGS. 4 and 5. Fiber pyrometry apparatus 602 may be substituted for TDL apparatus 402 or emission spectroscopy apparatus 502 within sensor apparatus 400, or may be used in combination with TDL apparatus 402 and/or emission spectroscopy apparatus 502.

In the exemplary embodiment, fiber pyrometry apparatus 602 is an optical diagnostic apparatus that is coupled to controller 118 and includes an infrared sensor 604 and a fiber 606. In the exemplary embodiment, fiber 606 is a silicon carbide fiber. Alternatively, fiber 606 may be any fiber that enables fiber pyrometry apparatus 602 to operate as described herein. Fiber 606 is positioned within reference combustion chamber 438 such that reference flame 434 transfers heat to fiber 606. Infrared sensor 604 is configured to detect infrared emissions from fiber 606. In operation, fiber pyrometry apparatus 602 is positioned adjacent to containment vessel 436 such that infrared sensor 604 is directed towards reference flame 434 within reference combustion chamber 438. Fiber 606 reaches quasi-equilibrium with the surrounding gas temperature and emits an infrared radiative spectrum, portions of which are collected by infrared detector 604 and communicated to controller 118 for further analysis to determine the temperature of reference flame 434. Controller 118 receives this measured data from fiber pyrometry apparatus 602 and determines the temperature of at least one combustion product, reference flame 434. Controller 118 further measures the differential fuel and air pressures across first and second flow restriction devices 426 and 424. Alternatively, controller 118 receives a signal from first flow restriction device 426 indicative the mass flow and/or the specific gravity of the fuel within fuel supply line 412.

Processor 200 (shown in FIG. 2) then accesses pre-determined combustion state data stored in memory device (shown in FIG. 2) and calculates the Wobbe index of the fuel using at least one of the Wobbe index equation (Eq. 1) and the Wobbe index correlation equation (Eq. 2) based on the measured combustion property and at least one of the measured differential fuel and air pressures, the mass flow of the fuel, and the specific gravity of the fuel. Once the Wobbe index of the fuel is calculated, controller 118 may then control the amount of fuel channeled to gas turbine engine 102 through primary fuel line 122 by operating fuel metering valve 116 (all shown in FIG. 1) based on the determined Wobbe index. Sensor apparatus 600 measures the Wobbe index in real-time, subsequently allowing instantaneous control of burner duty and firing temperatures of gas turbine engine 102. Use of combustion product temperatures as a metric facilitates the Wobbe index to be determined for a nearly limitless range of fuel constituents.

Figure 7:
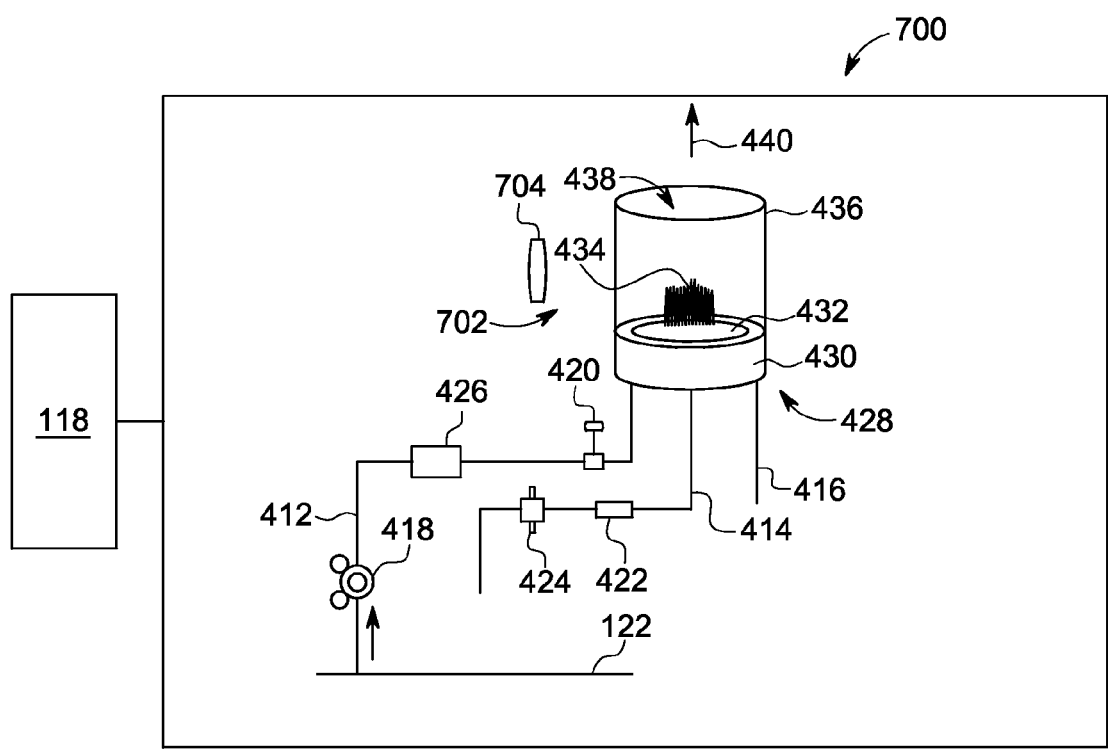
FIG. 7 is yet another embodiment of an exemplary sensor apparatus for use in a gas turbine engine system.

FIG. 7 illustrates an alternative embodiment of sensor apparatus 700 for use in gas turbine engine system 100 (shown in FIG. 1). Sensor apparatus 700 is substantially similar to sensor apparatus 400, 500, and 600 (shown in FIGS. 4-6), with the exception that sensor apparatus 700 includes an oxygen sensing apparatus 702, rather than TDL apparatus 402 (shown in FIG. 4), emission spectroscopy apparatus 502 (shown in FIG. 5), or fiber pyrometry apparatus 602 (shown in FIG. 6). As such, components shown in FIG. 7 are labeled with the same reference numbers used in FIGS. 4-6. Oxygen sensing apparatus 702 may be substituted for TDL apparatus 402, emission spectroscopy apparatus 502, or fiber pyrometry apparatus 602 within sensor apparatus 400, or may be used in combination with TDL apparatus 402 and/or emission spectroscopy apparatus 502, and/or fiber pyrometry apparatus 602.

In the exemplary embodiment, oxygen sensing apparatus 702 is an optical diagnostic apparatus that is coupled to controller 118 and includes an oxygen sensor 704 configured to sample exhaust gas 440 and measure oxygen concentration from infrared absorption. In operation, oxygen sensing apparatus 702 is positioned such that oxygen sensor 704 is in flow communication with exhaust gases 440 within reference combustion chamber 438. Oxygen sensor 704 collects at least a portion of exhaust gases 440 generated by reference combustion apparatus 428 and the oxygen concentration data measured by oxygen sensor 704 is communicated to controller 118. Controller 118 receives the measured data from oxygen sensing apparatus 702 and, based on the oxygen content of exhaust gases 440, determines the temperature of at least one combustion product, reference flame 434 and/or exhaust gases 440. Controller 118 further measures the differential fuel and air pressures across first and second flow restriction devices 426 and 424. Alternatively, controller 118 receives a signal from first flow restriction device 426 indicative the mass flow and/or the specific gravity of the fuel within fuel supply line 412.

Processor 200 (shown in FIG. 2) then accesses pre-determined combustion state data stored in memory device (shown in FIG. 2) and calculates the Wobbe index of the fuel using at least one of the Wobbe index equation (Eq. 1) and the Wobbe index correlation equation (Eq. 2) based on the measured oxygen content and at least one of the measured differential fuel and air pressures, the mass flow of the fuel, and the specific gravity of the fuel. Once the Wobbe index of the fuel is calculated, controller 118 may then control the amount of fuel channeled to gas turbine engine 102 through primary fuel line 122 by operating fuel metering valve 116 (all shown in FIG. 1) based on the determined Wobbe index. Sensor apparatus 500 measures the Wobbe index in real-time, subsequently allowing instantaneous control of burner duty and firing temperatures of gas turbine engine 102. Use of combustion product temperatures as a metric facilitates the Wobbe index to be determined for a nearly limitless range of fuel constituents.

The optical sensor apparatus described herein enables real-time detection and monitoring of gas turbine fuel energy content by combusting a pre-mixed fuel-air mixture in reference combustion apparatus to produce at least one combustion product. The sensor apparatus measures at least one property of at least one combustion product in the reference combustion apparatus, which operates independently of the gas turbine engine. The property of the combustion products, such as reference flame temperature and/or exhaust gas temperature, is measured in the controlled combustion environment using one or more optical diagnostic apparatuses. Fuel and air pressure differential measurements taken across first and second flow restrictions devices, such as venturi sections, enable correction for relative fuel/air ratio fluctuations so that the Wobbe index correlation is not confounded by equivalence ratio. A general correlation between the measured combustion product temperature and the product of Wobbe index and the square root ratio of fuel and air flow pressure differentials facilitates the sensor apparatus to determine the Wobbe index in real-time for a limitless range of fuel constituents, subsequently allowing instantaneous control of gas turbine engine burner duty. Alternatively, at least one of the mass flow and the specific gravity of the fuel may be measured by the first flow restriction device, such as a Coriolis flow meter, to enable a simplified calculation of the Wobbe index in real-time for a limitless range of fuel constituents, subsequently allowing instantaneous control of gas turbine engine burner duty.

An exemplary technical effect of the methods, systems, and apparatus described herein includes at least one of: (a)

measuring a property of a combustion product using at least one optical diagnostic apparatus consisting of (i) a tunable diode laser absorption spectroscopy apparatus that includes a laser transmitter configured to transmit a laser beam across the combustion chamber through the combustion product and that includes a laser receiver configured to receive the laser beam; and/or (ii) an emission spectroscopy apparatus that includes a collection lens configured to collect ultraviolet emissions from the combustion product; and/or (iii) a fiber pyrometry apparatus that includes an infrared sensor configured to detect infrared emissions from a fiber positioned within combustion chamber; and/or (iv) an oxygen sensing apparatus that includes an oxygen sensor configured to measure the oxygen content of the combustion product with an oxygen sensor; and (b) determining the Wobbe index of a fuel in real-time based on a measured property of a combustion product.

Exemplary embodiments of methods and apparatus for determining the Wobbe index of a fuel are described above in detail. The sensor apparatus and method of facilitating combustion are not limited to the specific embodiments described herein, but rather, components of systems and/or steps of the methods may be utilized independently and separately from other components and/or steps described herein. Although the present discussion focuses on a sensor apparatus for a gas turbine engine in an industrial environment, the present system is not limited to gas turbines, but is also applicable to other applications such as measurement of fuel quality in a jet engine or fuel composition measurement in a pipeline. For example, the methods may also be used in combination with other gas turbine systems applications employing gas fueled combustors, and are not limited to practice with only the gas turbine engine systems and methods as described herein. Furthermore, the principles and teachings set forth herein are applicable to gas turbine engines using a variety of combustible gas fuels such as, but not limited to, natural gas, LPG (Liquefied Petroleum Gas), LNG (liquefied natural gas), industrial process tail gas and other synthetic gases.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of facilitating combustion of a gaseous fuel in a gas turbine combustion section of a gas turbine, said method comprising:
    extracting a portion of the gaseous fuel prior to the gaseous fuel being supplied to the gas turbine;
    supplying the extracted portion of the gaseous fuel to a sensor apparatus comprising a reference combustion chamber;
    combusting a fuel-air mixture in the reference combustion chamber to yield at least one combustion product;
    measuring at least one property of the at least one combustion product using at least one optical diagnostic sensor apparatus;
    determining the Wobbe index of the fuel in real-time based on the measured at least one property of the at least one combustion product;
    controlling the combustion in the gas turbine based on the determined Wobbe index.

2. The method of claim 1, wherein the at least one combustion product is at least one of a flame produced by the reference combustion chamber and exhaust gases generated in the reference combustion chamber, and wherein the at least one property of the at least one combustion product is one of a temperature of the flame and a temperature of the exhaust gases.

3. The method of claim 1, wherein the at least one optical diagnostic sensor apparatus is a tunable diode laser absorption spectroscopy apparatus that includes a transmitter configured to transmit a laser beam and a receiver configured to receive the laser beam, wherein measuring the at least one property comprises:
    transmitting the laser beam, using the transmitter, across the reference combustion chamber through the at least one combustion product; and
    receiving the laser beam using the receiver.

4. The method of claim 1, wherein the at least one optical diagnostic sensor apparatus is an emission spectroscopy apparatus that includes a collection lens, wherein measuring the at least one property comprises collecting ultraviolet emissions from the at least one combustion product using the collection lens.

5. The method of claim 1, wherein the at least one optical diagnostic sensor apparatus is a fiber pyrometry apparatus that includes a fiber and an infrared sensor, wherein measuring the at least one property comprises detecting infrared emissions, using the infrared sensor, from the fiber positioned within the combustion chamber.

6. The method of claim 1, wherein the at least one diagnostic sensor apparatus is an oxygen sensing apparatus that includes an oxygen sensor, wherein measuring the at least one property comprises measuring the oxygen content of the at least one combustion product using the oxygen sensor.

7. The method of claim 1 further comprising channeling the fuel through a first flow restriction device and channeling air through a second flow restriction device, wherein the first flow restriction device measures at least one of the specific gravity of the fuel, the mass flow of the fuel, and the differential pressure of the fuel across the first flow restriction device, and wherein the second flow restriction device measures the differential pressure of the air across the second flow restriction device.

8. The method of claim 7 further comprising:
    storing pre-determined combustion state data associated with the combustion of the fuel in a controller;
    utilizing the measured at least one property of the at least one combustion product, the pre-determined combustion state data stored in the controller, and at least one of the measured specific gravity of the fuel, mass flow of the fuel, and differential pressures of the fuel and air across the first and second flow restriction devices to determine the Wobbe index of the fuel.

9. A sensor apparatus comprising:
    a reference combustion chamber, wherein said sensor apparatus is configured to receive fuel from a fuel supply line, to receive air from an air supply line, and to combust a fuel-air mixture within said reference combustion chamber to produce at least one combustion product;

at least one optical diagnostic apparatus coupled to said reference combustion chamber, said at least one optical diagnostic apparatus configured to measure a temperature of the at least one combustion product within said reference combustion chamber;

a first flow restriction device positioned in the fuel supply line and configured to measure at least one of a specific gravity of said fuel, a mass flow of said fuel, and a differential pressure of said fuel across said first flow restriction device;

a second flow restriction device positioned in the air supply line and configured to measure a differential pressure of air across said second flow restriction device; and a controller coupled to said at least one optical diagnostic apparatus and said first and second flow restriction devices, said controller configured to determine the Wobbe index of the fuel in real-time based on said measured temperature, said measured at least one of a specific gravity of said fuel, a mass flow of said fuel, and a differential pressure of said fuel across said first flow restriction device, and said differential pressure of air across said second flow restriction device.

10. The sensor apparatus of claim 9, wherein said at least one optical diagnostic apparatus comprises is a tunable diode laser absorption spectroscopy apparatus comprising a transmitter configured to transmit a laser beam across said reference combustion chamber through the at least one combustion product, said tunable diode laser absorption spectroscopy apparatus further comprising a receiver configured to receive the laser beam.

11. The sensor apparatus of claim 9, wherein said at least one optical diagnostic apparatus is an emission spectroscopy apparatus comprising a collection lens, wherein said emission spectroscopy apparatus is configured to collect ultraviolet emissions from the at least one combustion product using said collection lens.

12. The sensor apparatus of claim 9, wherein said at least one optical diagnostic apparatus is a fiber pyrometry apparatus comprising an infrared sensor, wherein said fiber pyrometry apparatus is configured to detect infrared emissions from a fiber positioned within said reference combustion chamber using said infrared sensor.

13. A gas turbine engine system comprising:

a fuel source configured to supply a gas turbine combustion section of the gas turbine engine system with a fuel through a primary fuel supply line;

a sensor apparatus coupled in fluid communication with said fuel source through a secondary fuel supply line configured for extracting a portion of the fuel from the primary fuel supply line prior to the fuel being supplied to the gas turbine, said sensor apparatus comprising:

a combustion apparatus defining a reference combustion chamber therein, wherein said combustion apparatus is configured to combust a fuel-air mixture within said reference combustion chamber to produce at least one combustion product; and at least one optical diagnostic apparatus coupled to said combustion apparatus, said at least one diagnostic apparatus configured to measure at least one property of the at least one combustion product within said reference combustion chamber; and a controller coupled to said sensor apparatus and configured to determine the Wobbe index of said fuel in real-time based on said measured at least one property of the at least one combustion product and pre-determined combustion state data stored within said controller and to provide signals for controlling combustion in the gas turbine combustion section based on the determined Wobbe index.

14. The gas turbine engine system of claim 13, wherein the at least one combustion product is at least one of a flame produced by said combustion apparatus and exhaust gases generated in said reference combustion chamber, wherein the at least one property of the at least one combustion product is one of a temperature of said flame, a temperature of the exhaust gases, and an oxygen content of the exhaust gases.

15. The gas turbine engine system of claim 13, wherein said primary fuel supply line comprises at least one fuel metering valve, wherein said controller is further configured to control said gas turbine combustion section using said fuel metering valve based on the determined Wobbe index of said fuel.

16. The turbine engine system of claim 13, wherein said controller is coupled to a first flow restriction device positioned in the secondary fuel supply line of said sensor apparatus and configured to measure at least one of a specific gravity of said fuel, a mass flow of said fuel, and a differential pressure of said fuel across said first flow restriction device, said controller is also coupled to a second flow restriction device positioned in an air supply line of said sensor apparatus and configured to measure a differential pressure of air across said second flow restriction device, wherein said secondary fuel supply line and air supply line are in fluid communication with said combustion apparatus.

* * * * *